H. C. GOODRICH.

SLATE FRAME.

No. 10,207. Reissued Sept. 26, 1882.

WITNESSES:

W. N. H. Knight

Newton Wyckoff.

INVENTOR

Harry C. Goodrich, by Philip T. Dodge.

Attorney

N. PETERS, Photo-Lithographer, Washington, D. C.

UNITED STATES PATENT OFFICE.

HARRY C. GOODRICH, OF CHICAGO, ILLINOIS.

SLATE-FRAME.

SPECIFICATION forming part of Reissued Letters Patent No. 10,207, dated September 26, 1882.

Original No. 188,792, dated March 27, 1877. Application for reissue filed July 24, 1882.

*To all whom it may concern:*

Be it known that I, HARRY C. GOODRICH, of the city of Chicago, Cook county, State of Illinois, have invented a new and useful Improvement in Slate-Frames, of which the following is a full description, reference being had to the accompanying drawings, in which—

Figure 1:
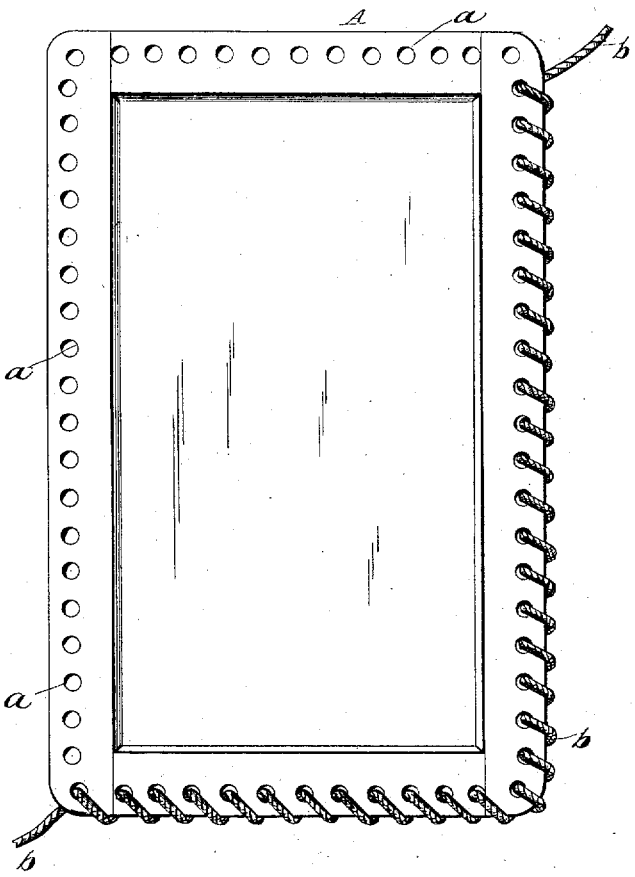
Figure 2:
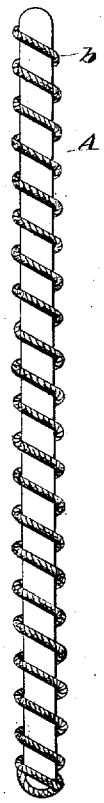
Figure 3:
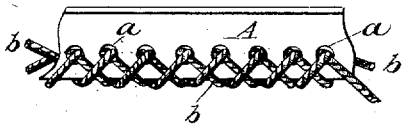

Figure 1 is a plan view in which a cord has been applied to a portion of the frame, and the remainder of the frame is shown ready to receive the cord; Fig. 2, an edge view; Fig. 3, a variation.

The use of slates in schools is attended with much noise in consequence of the contact of the frame with the desk.

The object of this invention is to so construct the frame that it will not be liable to come directly in contact with the desk; and this I accomplish by providing the slate-frame with a series of holes or openings, extending around the same a little distance from the outer edge, into which is inserted a cord or muffler, passing from hole to hole through and around the edge of the frame, whereby it serves as a muffler on both side faces as well as on the outer edge.

In the drawings, A represents the frame of a slate, made of wood, and in the usual manner.

*a a* represent a series of holes, located near each other and near the outer edge of the frame, extending entirely around the same. These holes may be about an eighth of an inch in diameter; but I do not limit myself to any exact size.

*b* is a muffling-cord, which may be made of cotton or any other suitable material. This cord is drawn into the holes *a*, passing from each hole to the next one over the edge of the frame, the ends being properly secured by tying or otherwise. I propose to use a cord large enough to nearly fill the holes. It will be observed that the cord passes across the outer edge of this frame diagonally, and protects the frame not only upon the outer edge, but upon its two sides.

A frame provided with a cord, as represented in Figs. 1 and 2, will be practically noiseless; but the cord can be carried around a second time, being passed through the same holes. The second winding should be in a direction opposite to the first, as shown in Fig. 3. In this case the cord must be somewhat smaller than the holes, as each hole receives the cord twice.

Instead of a series of holes extending around the edge of the frame, as described, the corners only might be provided with holes, and the ends and sides of the frame be provided with one or more long slots to receive the cord, in which case the cord could be wound close, excepting at the corners.

The cord might be applied in the following manner: The frame might be made somewhat smaller than is customary, and the strips of wood provided with notches upon the inside to be used, around which the cord could be wound. Such strips could then be secured to the edge of the frame by either nailing or, perhaps, by gluing.

I am aware that cloth has been applied to the corners of slates, and even the whole frame has been protected by cloth, and that rubber has been used for the purpose. I do not, therefore, broadly claim a noiseless slate-frame; but What I do claim as new, and desire to secure by Letters Patent, is as follows:

1. A muffling-cord applied in a spiral or winding form to the edge of a slate-frame, and protecting the same both on the edge and on the two side faces, substantially as shown.

2. A slate-frame having both side faces and the outer edge protected by a single cord of muffling material applied spirally through and around the edge, as described.

In testimony whereof I affix my signature in presence of two witnesses.

HARRY C. GOODRICH.

Witnesses:
EPHRAIM BANNING,
THOMAS KANE.